(12) United States Patent
Keren

(10) Patent No.: US 7,900,396 B2
(45) Date of Patent: Mar. 8, 2011

(54) IRRIGATION SYSTEM AND ASSEMBLY THEREFOR

(75) Inventor: Ron Keren, Negev (IL)

(73) Assignee: Nea Netafim, Ltd., Tel Aviv (IL)

( * ) Notice: Subject to any disclaimer, the term of this patent is extended or adjusted under 35 U.S.C. 154(b) by 367 days.

(21) Appl. No.: 12/127,324

(22) Filed: May 27, 2008

(65) Prior Publication Data

US 2008/0302003 A1 Dec. 11, 2008

Related U.S. Application Data

(60) Provisional application No. 60/942,295, filed on Jun. 6, 2007.

(51) Int. Cl.
*A01G 25/00* (2006.01)
(52) U.S. Cl. .......................................... 47/48.5
(58) Field of Classification Search ............... 47/48.5, 47/79; 137/135, 140, 79; 239/565, 1
See application file for complete search history.

(56) References Cited

U.S. PATENT DOCUMENTS

| | | | | | |
|---|---|---|---|---|---|
| 3,293,799 | A | * | 12/1966 | Keller et al. | 47/79 |
| 3,696,827 | A | * | 10/1972 | Sterlich | 137/79 |
| 4,317,539 | A | * | 3/1982 | Pollock | 239/1 |
| 4,447,983 | A | * | 5/1984 | Shinada | 47/48.5 |
| 4,676,023 | A | * | 6/1987 | Mori | 47/82 |
| 5,364,034 | A | * | 11/1994 | Hirahara | 239/565 |
| 5,626,162 | A | * | 5/1997 | Dispenza | 137/78.2 |
| 2006/0059612 | A1 | * | 3/2006 | Orcutt | 4/427 |
| 2008/0302003 | A1 | * | 12/2008 | Keren | 47/48.5 |

FOREIGN PATENT DOCUMENTS

| | | | |
|---|---|---|---|
| GB | 2187622 | | 9/1987 |
| GB | 2193623 | A * | 2/1988 |
| IL | 0104483 | A1 | 2/1998 |

* cited by examiner

*Primary Examiner* — Francis T Palo
(74) *Attorney, Agent, or Firm* — Womble Carlyle

(57) ABSTRACT

An irrigation system includes an activator that increases or decreases its weight respectively in response to an increase or decrease of pressure in the system. The activator biases a valve that controls the fluid pressure in the system.

24 Claims, 3 Drawing Sheets

IRRIGATION SYSTEM AND ASSEMBLY THEREFOR

The present application claims priority to U.S. Provisional Application No. 60/942,295, filed Jun. 6, 2007, whose contents are incorporated by reference in their entirety.

BACKGROUND

The present disclosure relates to an irrigation system and in particular to a low pressure irrigation system having an activator.

UK Patent Application 2187622, the disclosure of which is incorporated herein by reference, describes an irrigation system which includes a storage tank that receives a water supply from an inlet pipe and delivers under gravity flow a relatively low pressure water supply onwards to the system.

Spanish patent application ES2116820, the disclosure of which is incorporated herein by reference, describes a control system which includes a valve at an inlet to a tank and a float that senses the level of liquid in the tank and affects the flow of liquid through the valve.

The flow of fluid in a low pressure irrigation system may be sensed by other means.

SUMMARY

The following embodiment and aspects thereof are described and illustrated in conjunction with systems, tools and methods which are meant to be exemplary and illustrative, not limiting in scope.

In an embodiment an irrigation system comprises an activator, the activator comprising a vessel and a tube that meet at a join, at least a section of the system holds fluid and the vessel is in fluid communication with the section via the tube, wherein a rise of fluid pressure in the section above a predetermined level urges fluid to flow via the join into the vessel to increase the weight of the vessel and move the vessel.

Preferably, a plane transverse to the flow via the join the vessel has a cross section larger than the tube.

Typically, the tube is a flexible tube and the movement of the vessel biases a valve in the system which decreases the fluid flow into the section.

Optionally, the valve is located upstream of the section and the vessel is mechanically connected to the valve.

In an embodiment, the system comprises at least one additional vessel wherein adjacent vessels are connected by a tube segment, and wherein in a plane transverse to a fluid flow through the tube segment a cross of the tube segment is smaller than a cross section of the additional vessel.

In an embodiment, an irrigation system comprises a valve and an activator, at least a section of the system holds fluid wherein a rise of pressure in the section increases a weight of the activator which biases the valve to decrease a flow of fluid into the section.

Optionally, the valve comprises a pilot that is biased by the activator wherein a predetermined increase of the weight in the activator moves the pilot to a position which biases the valve to decrease the flow of fluid into the section.

In another aspect, the present invention is directed to an irrigation system assembly and also an irrigation system incorporating such an assembly. The assembly includes a valve having a movable member configured to control a flow of fluid; a vessel mechanically coupled to the movable member of the valve; and a tube in fluid communication with the vessel. An increase in fluid pressure in the tube urges a fluid in the tube to flow into the vessel, thereby increasing a weight of the vessel and altering a position of the movable member of the valve.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
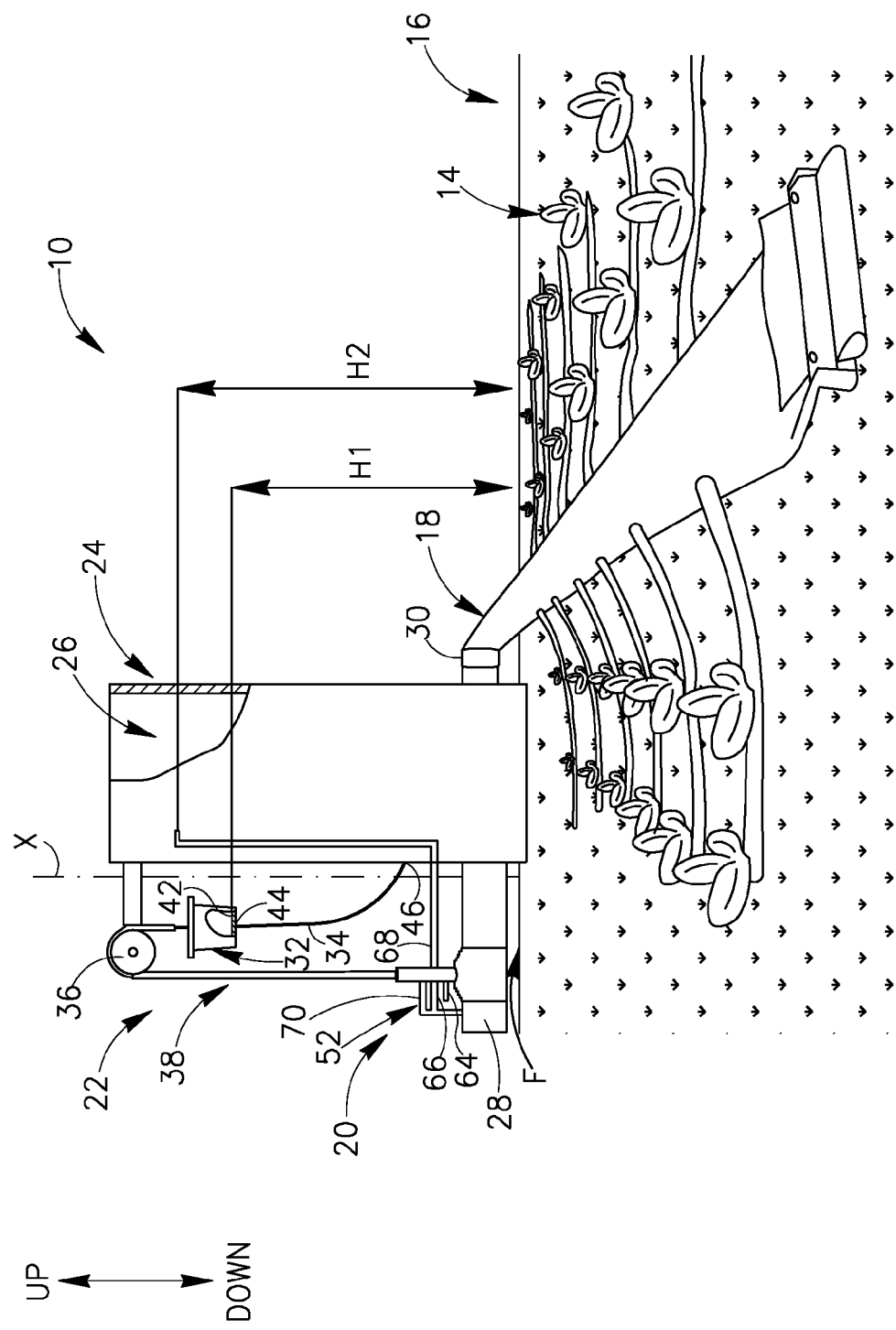
FIG. 1 shows a schematic view of a part of a first irrigation system incorporating an activator in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
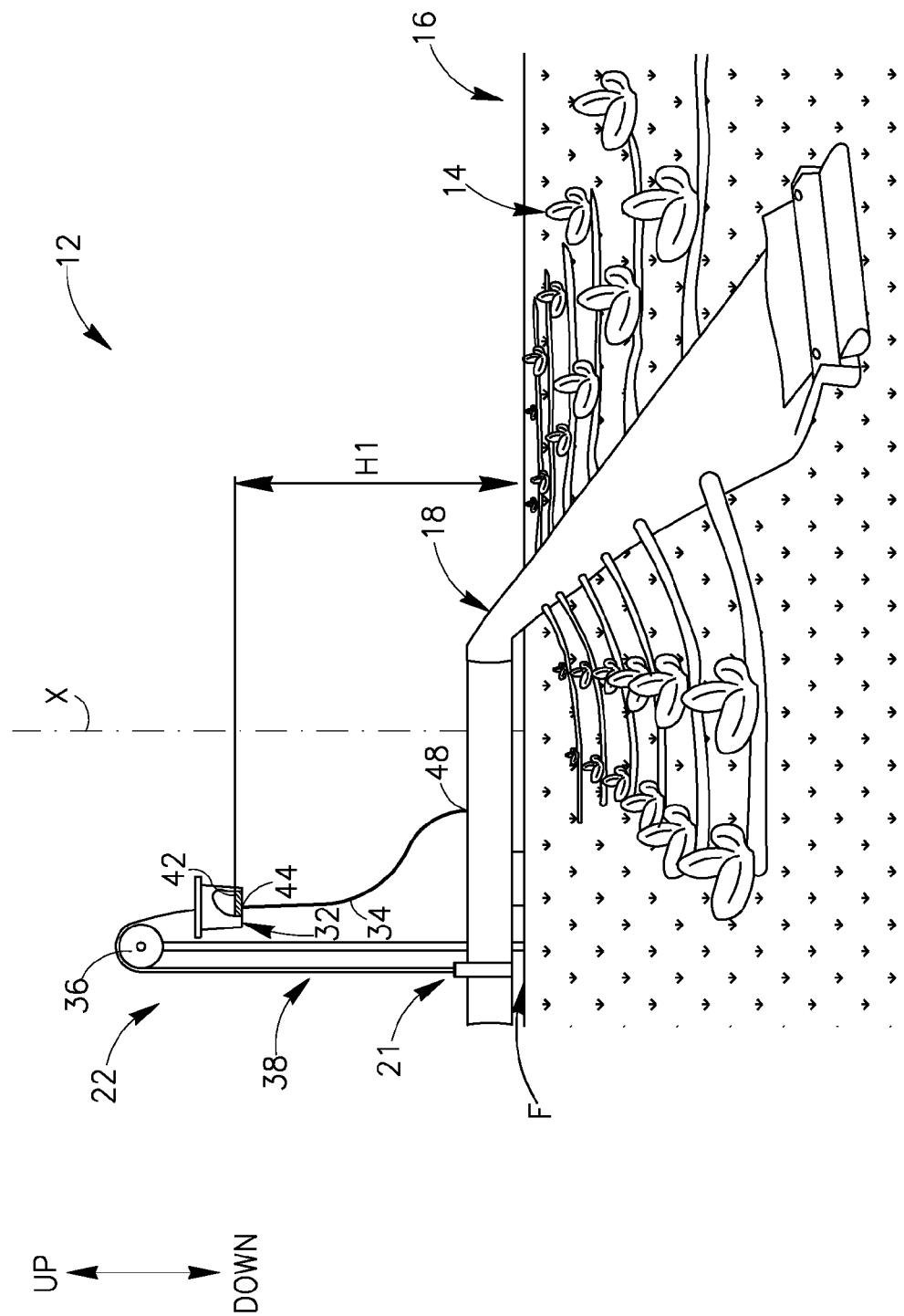
FIG. 2 shows a schematic view of a part of a second irrigation system incorporating the activator.

Attention is first drawn to FIGS. 1 and 2 to partially show first 10 and second 12 low pressure irrigation systems that irrigate a crop 14 in a field 16. Both systems 10, 12 have a pipe 18, a valve 20, 21 and an activator 22. The pipe 18 conveys fluid from an upstream fluid source (not shown) towards the crop 14 downstream and the valve 20, 21 regulates the fluid pressure in the system 10, 12 according to the activator 22. It is noted that the pipe 18, at least at portions thereof, is of a lay-flat type which when not in use under internal fluid pressure and/or when rolled on a reel may have a shape of a generally flat strip.

A ground face F of the field 16 is defined in the vicinity of the activator 22 and both systems have an axis X which extends upwardly from the ground face F. It should be noted that directional terms appearing throughout the specification and claims, e.g. "upstream", "downstream", "up", "down", "below" etc., (and derivatives thereof) are for illustrative purposes only, and are not intended to limit the scope of the appended claims.

Attention is drawn to FIG. 1. The first system 10 has a tank 24 in the form of a stand-pipe that stands on the ground face F and has axially extending internal cavity 26 that opens out at an upper end of the tank 24. The pipe 18 in the first system 10 has an inlet section 28 that leads fluid from the fluid source to the tank 24 and an outlet section 30 that leads fluid from the tank 24 towards the crop 14 downstream. The valve 20 in the first system 10 is located on the inlet section 28.

Attention is additionally drawn back to FIG. 2. In each system 10, 12 the activator 22 has a vessel 32, a flexible tube 34, a hinge 36 and a cable 38. The vessel 32 has an internal void surrounded by a face which includes a generally upwardly facing base 42 at a lower end thereof. The tube 34 meets and communicates with the base 42 of the vessel 32 at a join 44 and extends downwardly therefrom to communicate with the systems 10, 12. In the first system 10 the tube 34 meets the system at a first merge 46 which is optionally located on the tank 24 (FIG. 1). In the second system 12 the tube 34 meets the system at a second merge 48 on the pipe 18 downstream of the valve 21 (FIG. 2). In both systems 10, 12 the base 42 of the vessel 32 is at a height H1 above the ground face F and the vessel 32 hangs on the cable 38 which extends a first segment upwardly to the hinge and a second segment downwardly to the valve 20, 21 to thereby mechanically connect the vessel 32 and valve 20, 21.

During irrigation, fluid flows under pressure in both systems 10, 12. In the first system 10, an increase or decrease of fluid pressure downstream of the valve 20 respectively results in an upward rise or downward fall of the fluid level in the tank 24. A given fluid level in the tank 24, located axially between the first merge 46 and the join 44, is reflected by a similar fluid level in the tube 34. In the second system 12, an increase or decrease of fluid pressure at a vicinity of the pipe 18 adjacent the second merge 48 respectively results in an upward rise or downward fall of the level of fluid in the tube 34.

For certain fluid flow rates, a means located adjacent each merge 46, 48 may be required in order to transform the fluid flow to a height of fluid in the tube 34 that correctly represents the pressure of the fluid adjacent the merge 46, 48. In the first system 10 the tank 24 may act as such a means.

In both systems 10, 12 a cross sectional area of the interior of the tube 34 taken below the join 44 in a plane perpendicular to the axis X is smaller than a cross sectional area of the void of the vessel 32 taken above the join 44 in a similar oriented plane. As the fluid pressure in both systems 10, 12, at a location downstream of the valve 20, 21, rises to a corresponding fluid level in the tube 34 of slightly above H1, fluid enters the vessel 32 and increases its weight. This fluid bears against the base 42 of the vessel 32 and biases the vessel 32 downwardly and the second segment of the cable 38 upwardly. The downward movement of the vessel 32 may be limited or damped by a limit of the valve 20, 21. As the fluid pressure in both systems 10, 12, at a location downstream of the valve 20, 21, falls to a corresponding fluid level in the tube 34 of slightly below H1, fluid exits the vessel 32 and the vessel may be urged back to its previous position by the limit.

It is noted that the movements of the vessel 32 may be used to trigger any given procedure in the irrigation system 10, 12. For example, the movement of the vessel 32 may trigger an alert by sending for example an SMS or any other indication or alarm. Other procedures are also within the scope of the present disclosure.

The valve 20 of the first system 10 is a diaphragm type controlled hydraulic valve. In such valves, an increase or decrease of fluid pressure in a chamber above a diaphragm (chamber and diaphragm not shown) urges the diaphragm to respectively decrease or increase a fluid passage (not shown) through the valve 20. The fluid pressure entering the chamber may be controlled by a pilot.

Figure 3:
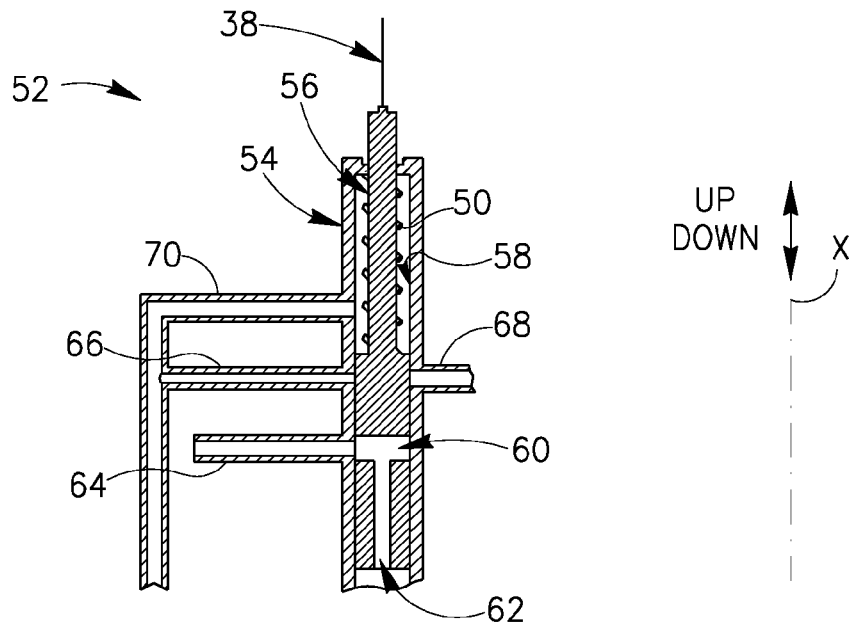
FIG. 3 shows a cross sectional view of a portion of a first valve.

Attention is now drawn to FIGS. 1 and 3. A pilot 52 of the valve 20 of the first irrigation system 10 has a case 54, a piston 56 and the limit 50. The case 54 has an axially extending lumen 58 and the piston 56 is located in the lumen 58. The limit 50, which is optionally a spring, is located between an upper portion of the piston 56 and an upper end of the lumen 58. The piston 56 has an axially extending peripheral face and a channel 60 and bore 62 that are formed therein. The channel 60 opens out to opposing sides of the peripheral face and the bore 62 communicates with the channel 60 and opens out to a lower end of the piston 56. The chamber above the diaphragm is in fluid communication with a lower end of the pilot 52 and the second segment of the cable 38 connects to an upper end of the piston 56. It is noted that the channel 60 may be in the form of an annular groove (not shown) that is formed on the peripheral face of the piston 56 and at least partially communicates with the bore 62.

case 54 has in addition four passageways. The first passageway 64 communicates between a lower portion of the lumen 58 and the open air. The second 66 and third 68 passageways communicate with opposing sides of a middle portion of the lumen 58. The forth passageway 70 communicates with an upper portion of the lumen 58 and merges with the second passageway 66 to communicate with a portion of the pipe 18 upstream of the valve 20. The third passageway 68 merges and communicates at a height H2 above the ground face F (see FIG. 1) with an upper portion of the tank 24. Optionally, H2>H1 and further optionally the third passageway 68 may open out at the height H2 to the open air at a location above or aside of the tank 24 (not shown).

The fluid pressure P in the first system 10, at a location downstream of the valve 20, is regulated as follows. At P<H1, the limit 50 of the valve 20 bears against the piston 56 and urges it to a low position of the pilot 52 in which the first passageway 64 is in fluid communication via the channel 60 and bore 62 with the chamber of the valve 20 (low position is shown in FIG. 3). The diaphragm of the valve 20 in the low position is thereby exposed to atmospheric pressure which allows the fluid passage though the valve 20 to fully open.

At P>H1, fluid enters the vessel 32 of the activator 22 and thereby urges the vessel 32 downwardly and the piston 56 upwardly. At P=Pm>H1, the upwardly urging force of the activator 22 balances the downwardly urging force of the limit 50 at a middle position of the pilot 52 in which the second passageway 66 communicates via the channel 60 and bore 62 with the chamber of the valve 20 and with the third passageway 68. In the middle position, fluid may reach a height in the third passageway 68 of up to H2 and thereby impose a pressure of up to H2 upon the diaphragm which accordingly reduces the passage of fluid through valve 20.

In the case that the third passageway 68 merges at the height H2 with the tank 24 (as shown in FIG. 1), if the pilot 52 is in the middle position and the level of fluid in the tank 24 rises to a height of above H2 then the pressure imposed upon the diaphragm is equivalent to the height of the fluid in the tank 24 which is larger than H2.

At P=Ph>Pm, the upwardly urging force of the activator 22 overcomes the downwardly urging force of the limit 50 to position the piston 56 at a top position of the pilot 52 in which the forth passageway 70 communicates via the channel 60 and bore 62 with the chamber of the valve 20. In the top position, the fluid pressure upstream of the valve 20 is imposed upon the diaphragm and substantially decreases or closes the passage of fluid through the valve 20.

Figure 4:
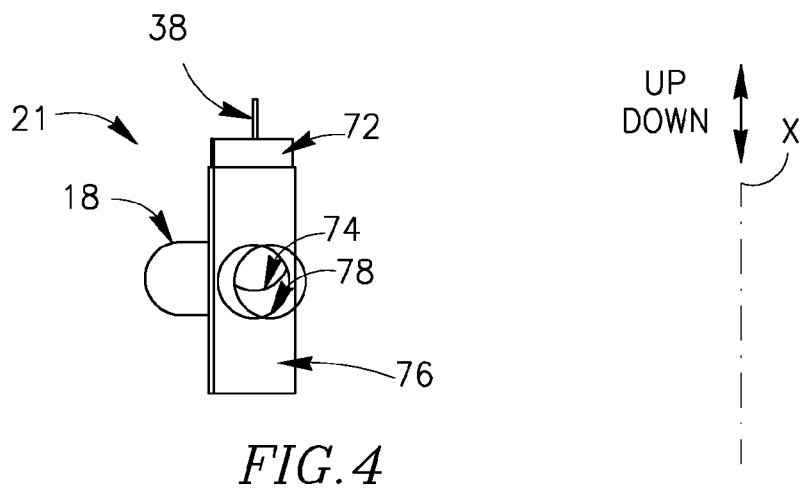
FIG. 4 shows a perspective view of a second valve.

Attention is now drawn to FIGS. 2 and 4. The valve 21 of the second system 12, which is a direct pressure regulator, has a movable plate 72 with an aperture 74 that slides within a housing 76 with an opening 78. The fluid pressure P in the second system 12, at a location downstream of the valve 21, is regulated as following. At P<H1, a limit (not shown) of the valve 21 bears against the plate 72 to urge the aperture 74 and opening 78 to fully overlap and thereby fully open a fluid passage though the valve 21. At P>H1, fluid enters the vessel 32 of the activator 22 and thereby urges the vessel 32 downwardly and the plate 72 upwardly. As a result, the aperture 74 and the opening 78 may only partially overlap and the passage for fluid via the valve 21 may decrease.

Figure 5:
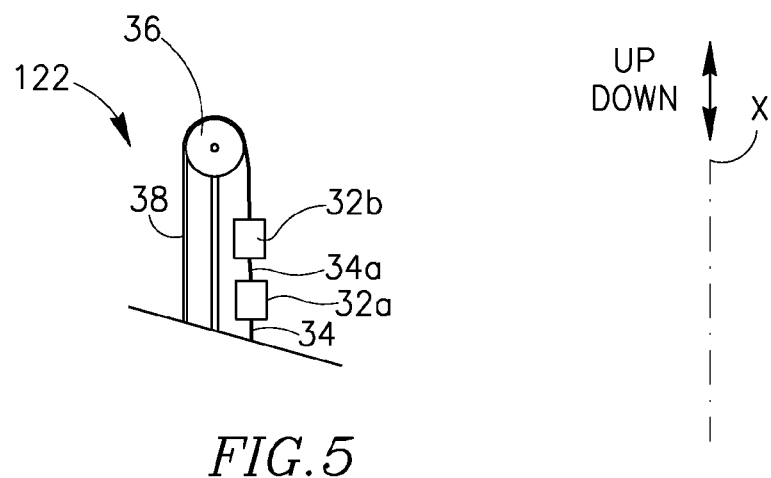
FIG. 5 shows an activator in accordance with an embodiment of the present disclosure.

It is noted that the activator in accordance with the present disclosure may include two or more vessels. Attention is now drawn to FIG. 5. In an embodiment of the disclosure, an activator 122 connected to an irrigation system by a tube 34 includes two vessels 32a, 32b in a row connected by an intermediate tube 34a. In this activator 122, fluid rising in the tube 34 first enters fills vessel 32a to impose a first biasing force F1 downwardly. As the fluid continues to rise, it enters and fills vessel 32b via the intermediate tube 34a to impose an additional biasing force F2 downwardly. The provision of two or more forces F1, F2 in the activator 122 may as an example be used to control the valve 20 of the first system 10. In this example, the first force F1 may be used to transfer the piston 56 from the low position to the middle position and the additional second force F2 may be used to transfer the piston 56 from the middle position to the top position.

It is noted that the valve 21 of the second system 12 may be any mechanism that limits the flow of fluid through the pipe 18. For example, the valve 21 may be an object that is urged to press or not-press upon a lay flat flexible portion of the pipe 18 in order to respectively decrease or increase a passage therethrough.

In an embodiment of the disclosure, a modified activator may include a rod (not shown), instead of the cable 38 and hinge 36, which extends directly downwardly from the vessel 32 to the valve 20, 21. Such a modified activator therefore has a "reversed" function in relation to the activator 22 described hereinabove. For example, if this modified activator is connected to the first valve 20 then any rise of fluid pressure in the system 10 which would previously result in an upward movement of the piston 56 would now "reversely" result in a downward movement of the piston 56. Therefore, a system using the modified activator should be adjusted accordingly by for example switching between the locations where first 64 and fourth 70 passageways communicate with the lumen 58 of the pilot 52.

It is noted that H1 is optionally smaller than or equal to 10 meters above the ground face F and the fluid pressure in the irrigation systems 10, 12 when referred to in the description hereinabove relates to meters of fluid above the ground face F.

Although the present embodiment has been described to a certain degree of particularity, it should be understood that various alterations and modifications could be made without departing from the scope of the disclosure as hereinafter claimed.

What is claimed is:

1. An irrigation system comprising an activator,
   the activator comprising a vessel and a tube that meet at a join,
   at least a section of the system holds fluid and the vessel is in fluid communication with the section via the tube, wherein
   a rise of fluid pressure in the section above a predetermined level urges fluid to flow via the join into the vessel to increase the weight of the vessel and move the vessel.

2. An irrigation system according to claim 1, wherein in a plane transverse to the flow via the join the vessel has a cross section larger than the tube.

3. An irrigation system according to claim 1, wherein the tube is a flexible tube.

4. An irrigation system according to claim 1, wherein the movement of the vessel biases a valve in the system to decrease a fluid passage therethrough.

5. An irrigation system according to claim 4, wherein the valve is located upstream of the section.

6. An irrigation system according to claim 4, wherein the vessel is mechanically connected to the valve.

7. An irrigation system according to claim 1, wherein the system comprises at least one additional vessel, and wherein adjacent vessels are connected by a tube segment.

8. An irrigation system according to claim 7, wherein in a plane transverse to a fluid flow through the tube segment a cross of the tube segment is smaller than a cross section of the additional vessel.

9. An irrigation system comprising a valve and an activator,
   at least a section of the system holds fluid wherein a rise of pressure in the section increases a weight of the activator which moves the activator and biases the valve to decrease a fluid passage therethrough.

10. An irrigation system according to claim 9, wherein the valve comprises a pilot that is biased by the activator, and wherein
    a predetermined increase of the weight in the activator moves the pilot to a position which biases the valve to decrease the fluid passage therethrough.

11. An irrigation system according to claim 9, wherein the valve is located upstream of the section.

12. An irrigation system assembly, comprising:
    a valve having a movable member configured to control a flow of fluid;
    a vessel mechanically coupled to the movable member of the valve; and
    a tube in fluid communication with the vessel, wherein:
    an increase in fluid pressure in the tube urges a fluid in the tube to flow into the vessel, thereby increasing a weight of the vessel and moving the vessel to alter a position of the movable member of the valve.

13. An irrigation system assembly, comprising:
    a valve having a movable member configured to control a flow of fluid;
    a vessel mechanically coupled to the movable member of the valve; and
    a tube in fluid communication with the vessel, wherein:
    an increase in fluid pressure in the tube urges a fluid in the tube to flow into the vessel, thereby increasing a weight of the vessel and altering a position of the movable member of the valve; and
    in a first position, the movable member permits passage of fluid through the valve.

14. The irrigation system assembly according to claim 13, wherein:
    the movable member comprises a plate having an aperture therethrough; and
    in said first position, the aperture cooperates with an opening of a valve housing to permit fluid to pass through said valve.

15. The irrigation system assembly according to claim 13, wherein:
    the movable member of the valve comprises a piston mechanically connected to the vessel via a cable; and
    in the first position, a channel of the piston permits fluid to pass through said valve.

16. The irrigation system assembly according to claim 12, wherein:
    the tube is a flexible tube.

17. The irrigation system assembly according to claim 12, wherein:
    the vessel has a horizontal cross section larger than a horizontal cross section of the tube.

18. The irrigation system assembly according to claim 12, comprising:
- at least two vessels connected to one another by a tube segment.

19. An irrigation system, comprising:
- an irrigation pipe configured to deliver fluid to a crop in a field; and
- an irrigation system assembly comprising:
    - a valve having a movable member;
    - a vessel mechanically coupled to the movable member of the valve; and
    - a first tube in fluid communication with the vessel, wherein:
        - an increase in fluid pressure in the first tube urges a fluid in the tube to flow into the vessel, thereby increasing a weight of the vessel and moving the vessel to alter a position of the movable member of the valve to thereby control fluid flow through the irrigation pipe.

20. The irrigation system assembly according to claim 12, wherein:
- in a first position, the movable member permits passage of fluid through the valve.

21. The irrigation system assembly according to claim 20, wherein:
- the movable member comprises a plate having an aperture therethrough; and
- in said first position, the aperture cooperates with an opening of a valve housing to permit fluid to pass through said valve.

22. The irrigation system assembly according to claim 20, wherein:
- the movable member of the valve comprises a piston mechanically connected to the vessel via a cable; and
- in the first position, a channel of the piston permits fluid to pass through said valve.

23. An irrigation system assembly, comprising:
- a valve having a movable member whose position controls flow of fluid through the valve;
- a vessel mechanically coupled to the movable member of the valve; and
- a first tube in fluid communication with the vessel, wherein:
- an increase in fluid pressure in the first tube urges a fluid in the tube to flow into the vessel, causing the vessel to alter a position of the movable member and affect flow of fluid through the valve.

24. An irrigation system, comprising:
- an irrigation pipe configured to deliver fluid to a crop in a field; and
- an irrigation system assembly comprising:
    - a valve having a movable member whose position controls flow of fluid through the valve and into the irrigation pipe;
    - a vessel mechanically coupled to the movable member of the valve; and
    - a first tube in fluid communication with the vessel, wherein:
- an increase in fluid pressure in the first tube urges a fluid in the tube to flow into the vessel, causing the vessel to alter a position of the movable member and affect flow of fluid through the valve and into irrigation pipe.

* * * * *

UNITED STATES PATENT AND TRADEMARK OFFICE
CERTIFICATE OF CORRECTION

| | | |
|---|---|---|
| PATENT NO. | : 7,900,396 B2 | Page 1 of 1 |
| APPLICATION NO. | : 12/127324 | |
| DATED | : March 8, 2011 | |
| INVENTOR(S) | : Keren | |

It is certified that error appears in the above-identified patent and that said Letters Patent is hereby corrected as shown below:

On title page, in Item (73), please change the name of the assignee from "Nea Netafim, Ltd." to --Netafim, Ltd.--

Signed and Sealed this
Third Day of May, 2011

David J. Kappos
*Director of the United States Patent and Trademark Office*